United States Patent
Von Andrian et al.

(10) Patent No.: US 11,310,096 B2
(45) Date of Patent: Apr. 19, 2022

(54) NOTIFICATION SYSTEM AND METHOD OF MONITORING A MULTI-COMPONENT SYSTEM

(71) Applicant: Rohde & Schwarz GmbH & Co. KG, Munich (DE)

(72) Inventors: Jonas Von Andrian, Munich (DE); Balthasar Biedermann, Munich (DE); Vittorio Curcio, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 18 days.

(21) Appl. No.: 16/579,538

(22) Filed: Sep. 23, 2019

(65) Prior Publication Data
US 2021/0091997 A1  Mar. 25, 2021

(51) Int. Cl.
| | |
|---|---|
| *H04L 12/24* | (2006.01) |
| *H04L 12/26* | (2006.01) |
| *G06N 5/04* | (2006.01) |
| *H04L 12/58* | (2006.01) |
| *H04W 4/14* | (2009.01) |
| *H04L 29/08* | (2006.01) |
| *H04L 41/0631* | (2022.01) |
| *H04L 43/106* | (2022.01) |
| *H04L 51/224* | (2022.01) |
| *H04L 67/55* | (2022.01) |

(52) U.S. Cl.
CPC ............ *H04L 41/064* (2013.01); *G06N 5/04* (2013.01); *H04L 43/106* (2013.01); *H04L 51/24* (2013.01); *H04L 67/26* (2013.01); *H04W 4/14* (2013.01)

(58) Field of Classification Search
CPC ..... H04L 41/064; H04L 43/106; H04L 51/24; H04L 67/26; G06N 5/04; H04W 4/14
See application file for complete search history.

(56) References Cited

U.S. PATENT DOCUMENTS

| | | | |
|---|---|---|---|
| 7,243,130 B2 | 7/2007 | Horvitz et al. | |
| 8,578,093 B1* | 11/2013 | Dafoe | G06F 3/0604 |
| | | | 711/114 |
| 2014/0121789 A1* | 5/2014 | Brandes | G05B 23/027 |
| | | | 700/80 |
| 2016/0112526 A1* | 4/2016 | Jeong | H04L 67/26 |
| | | | 709/204 |
| 2018/0288736 A1* | 10/2018 | Raman | H04L 43/16 |
| 2019/0171428 A1* | 6/2019 | Patton | G06N 20/00 |
| 2020/0007487 A1* | 1/2020 | Chao | G06F 40/169 |
| 2020/0029029 A1* | 1/2020 | Steffanson | G08B 21/0469 |

* cited by examiner

*Primary Examiner* — Brian Whipple
(74) *Attorney, Agent, or Firm* — Christensen O'Connor Johnson Kindness PLLC

(57) ABSTRACT

A notification system for monitoring a multi-component system is disclosed. The notification system comprises a notification processing module and an event processing module. The event processing module comprises an event input and an event classifier module. The event input is configured to receive an event signal that comprises at least one status parameter being indicative of at least one of a status and a status change of at least one component of the multi-component system. The event classifier module is configured to classify the event signal into at least one event class based on the at least one status parameter. The notification processing module is configured to generate no user notification or at least one user notification based on the at least one event class. Further, a method of monitoring a multi-component system is disclosed.

16 Claims, 1 Drawing Sheet

NOTIFICATION SYSTEM AND METHOD OF MONITORING A MULTI-COMPONENT SYSTEM

FIELD OF THE DISCLOSURE

Embodiments of the present disclosure relate generally to a notification system for monitoring a multi-component system. Embodiments of the present disclosure further relate to a method of monitoring a multi-component system.

BACKGROUND

For the monitoring of computer network systems, particularly for monitoring cloud network systems, it is common to have a notification system that alerts the user or rather the system administrator whether there are any malfunctions and/or problems in the computer network.

However, common notification systems create an alert for every single problem in the network. This can lead to a large number of emails in certain circumstances. For example, if the uplink for an office is down, all devices inside that office are immediately marked as offline and thus for every device inside that office an alert would be created.

One way to reduce the number of alerts generated is to allow each device to have a certain offline time before an alert is generated. In this case, however, the system administrator may not be informed timely about the potential issues in the network.

Accordingly, there is a need for a notification system for monitoring a multi-component system as well as for a method of monitoring a multi-component system that provide the user with prompt information while keeping the number of notification messages low.

SUMMARY

Embodiments of the present disclosure provide a notification system for monitoring a multi-component system. In one embodiment, the notification system comprises a notification processing module and an event processing module. The event processing module comprises an event input and an event classifier module. The event input is configured to receive an event signal. The event signal comprises at least one status parameter, the at least one status parameter being indicative of at least one of a status and a status change of at least one component of the multi-component system. The event classifier module is configured to classify the event signal into at least one event class based on the at least one status parameter. The notification processing module is configured to generate no user notification or at least one user notification based on the at least one event class.

The notification system according to the disclosure is based on the principal idea to classify each event into one or several event classes and to generate the user notification only after classifying the event signal.

In other words, the event classifier module analyzes the event signal and determines whether the at least one event signal matches certain predefined rules being associated with the respective event classes and categorizes the at least one event signal into one or several event classes.

For example, the at least one event signal may be categorized into several event classes if the respective event signal matches several of the predefined rules.

One user notification may be generated for each event class the at least one event signal is categorized into. The respective event class is associated with a "bad state" of the respective component of the multi-component system. This way, the user is immediately notified about the type of problem that may be present in the multi-component system.

Generally speaking, the event classes each are associated with a "good state" or a "bad state" of the respective component of the multi-component system, wherein "good state" means that there is no malfunction of the respective component, at least regarding a function of the component described by this event class. Accordingly, "bad state" means that there is a malfunction of the respective component regarding this event class.

If the at least one event signal is classified only into classes being associated with a "good state" of the multi-component system, no user notification may be generated at all. This way, the number of user notifications is reduced.

For example, if the multi-component system is a computer network, the at least one status parameter may comprise information about individual computers in the network, for example information about their connection status (online or offline), power supply, responsivity etc.

According to one aspect of the disclosure, the notification system comprises a setting module. The setting module comprises, for example, at least one setting parameter. In an embodiment, the notification processing module is configured to at least one of approve, save and discard the user notification based on the at least one setting parameter. Of course, the user may adapt the setting parameter and thus choose which type of user notifications are generated. In other words, the user may choose about which type of events in the multi-component system the user notifications are generated.

If the user notification is approved by the notification processing module, the user notification is sent to the user, for example immediately.

If the user notification is saved by the notification processing module, the user notification is not sent to the user immediately, but possible later, for example after a predetermined time span.

If the user notification is discarded by the notification processing module, the user notification is not sent to the user.

According to a further aspect of the disclosure, the status parameter comprises a time stamp. In an embodiment, the time stamp is a time of recording of the at least one of the status and the status change. Thus, the events being associated with the respective event signals can be correctly traced back in time even if there have been delays during the transmission of the event signal to the event input. This is particularly important for reconstructing a causal chain of malfunctions in the multi-component system and thus for finding the root problem of the chain of malfunctions.

The event signal may comprise at least one attribute parameter. The at least one attribute parameter is indicative of at least one property of the at least one component. Accordingly, the at least one attribute parameter provides additional information on the context of a possible malfunction or problem.

For example, if the multi-component system is a computer network, the attribute parameter may be an IP address, a MAC address, a physical location of the respective component, an identification of software running on the respective component, an IP address of an unsuccessful login attempt etc.

In an embodiment of the present disclosure, the event classifier module is configured to classify the event signal into the at least one event class based on the at least one attribute parameter. Accordingly, the context of the possible malfunction or problem is taken into account during the classification of the at least one event signal.

In a further embodiment of the present disclosure, the notification processing module is configured to generate the at least one user notification based on the at least one attribute parameter. For example, the user notification comprises the information being associated with the at least one attribute parameter. Accordingly, additional information about the context of the possible malfunction or problem is sent to the user with the user notification.

In some embodiments, the notification system is configured to transmit the at least one user notification via at least one of email, text message, push message and web frontend. For example, the user notification is forwarded to a user device such as a computer, laptop, smartphone, tablet or any other suitable smart device. This way, the user can be informed about malfunctions in the multi-component system at any time and at any place with call reception, internet or mobile internet.

The notification processing module may be configured to aggregate several event signals being classified into the same event class into a common user notification. Thus, the number of user notifications actually being sent to the user is significantly reduced as all events being similar in nature are bundled into one user notification each. At the same time, no information is lost. On the contrary, the user receives user notifications with all problems falling into the same event class. Thus, it is particularly easy for the user to gain an insight whether that particular problem is isolated in few components of the multi-component system or widespread.

According to another aspect of the present disclosure, the notification processing module is configured to generate the user notification based on at least one of a number of event signals, an event signal rate, a time development of the number of event signals and a time development of the event signal rate. On one hand, the respective user notification may comprise information on the number of event signals falling into the respective event class being associated with the respective user notification, the event signal rate, the time development of the number of event signals and the time development of the event signal rate. On the other hand, the user notification may be generated only if certain thresholds regarding at least one of the number of event signals, the event signal rate, the time development of the number of event signals and the time development of the event signal rate are met.

Embodiments of the present disclosure further provide a method of monitoring a multi-component system. In an embodiment, the method comprises the following steps:
  receiving an event signal, the event signal comprising at least one status parameter, the at least one status parameter being indicative of at least one of a status and a status change of at least one component of the multi-component system;
  classifying the event signal into at least one event class based on the at least one status parameter; and
  generating no user notification or at least one user notification based on the at least one event class.

Regarding the advantages of the method according to the disclosure, reference is made to the explanations given above regarding the notification system that also hold for the method and vice versa.

According to an aspect of the present disclosure, the user notification is at least one of approved, saved and discarded. If the user notification is approved, the user notification is sent to the user, for example immediately. If the user notification is saved, the user notification is not sent to the user immediately, but possible later, for example after a predetermined time span. If the user notification is discarded, the user notification is not sent to the user, for example never sent to the user.

The status parameter may comprise a time stamp. The time stamp can be a time of recording of the at least one of the status and the status change. Thus, the events being associated with the respective event signals can be correctly traced back in time even if there have been delays during the transmission of the event signal to the event input. This is particularly important for reconstructing a causal chain of malfunctions in the multi-component system and thus for finding the root problem of the chain of malfunctions.

According to a further aspect of the present disclosure, the event signal comprises at least one attribute parameter, the at least one attribute parameter being indicative of at least one property of the at least one component. Accordingly, the at least one attribute parameter provides additional information on the context of a possible malfunction or problem.

For example, if the multi-component system is a computer network, the attribute parameter may be an IP address, a MAC address, a physical location of the respective component, an identification of software running on the respective component, an IP address of an unsuccessful login attempt, etc.

In an embodiment of the present disclosure, the event signal is classified into the at least one event class based on the at least one attribute parameter. Accordingly, the context of the possible malfunction or problem is taken into account during the classification of the at least one event signal.

The user notification may be generated based on the at least one attribute parameter. For example, the user notification comprises the information being associated with the at least one attribute parameter. Accordingly, additional information about the context of the possible malfunction or problem is sent to the user with the user notification.

In some embodiments, the user notification is transmitted via at least one of email, text message, push message and web frontend. For example, the user notification is forwarded to a user device such as a computer, laptop, smartphone, tablet or any other suitable smart device. This way, the user can be informed about malfunctions in the multi-component system at any time and at any place with call reception, internet or mobile internet.

In a further embodiment of the present disclosure, event signals being classified into the same event class are aggregated into a common user notification. Thus, the number of user notifications actually being sent to the user is significantly reduced as all events being similar in nature are bundled into one user notification each. At the same time, no information is lost. On the contrary, the user receives user notifications with all problems falling into the same event class. Thus, it is particularly easy for the user to gain an insight whether that particular problem is isolated in few components of the multi-component system or widespread.

According to one aspect of the present disclosure, the user notification is generated based on at least one of a number of event signals, an event signal rate, a time development of the number of event signals and a time development of the event signal rate. On one hand, the respective user notification may comprise information on the number of event signals falling into the respective event class being associated with the respective user notification, the event signal rate, the time development of the number of event signals and the time development of the event signal rate. On the other hand, the user notification may be generated only if certain thresholds regarding at least one of the number of event signals, the event signal rate, the time development of the number of event signals and the time development of the event signal rate are met.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
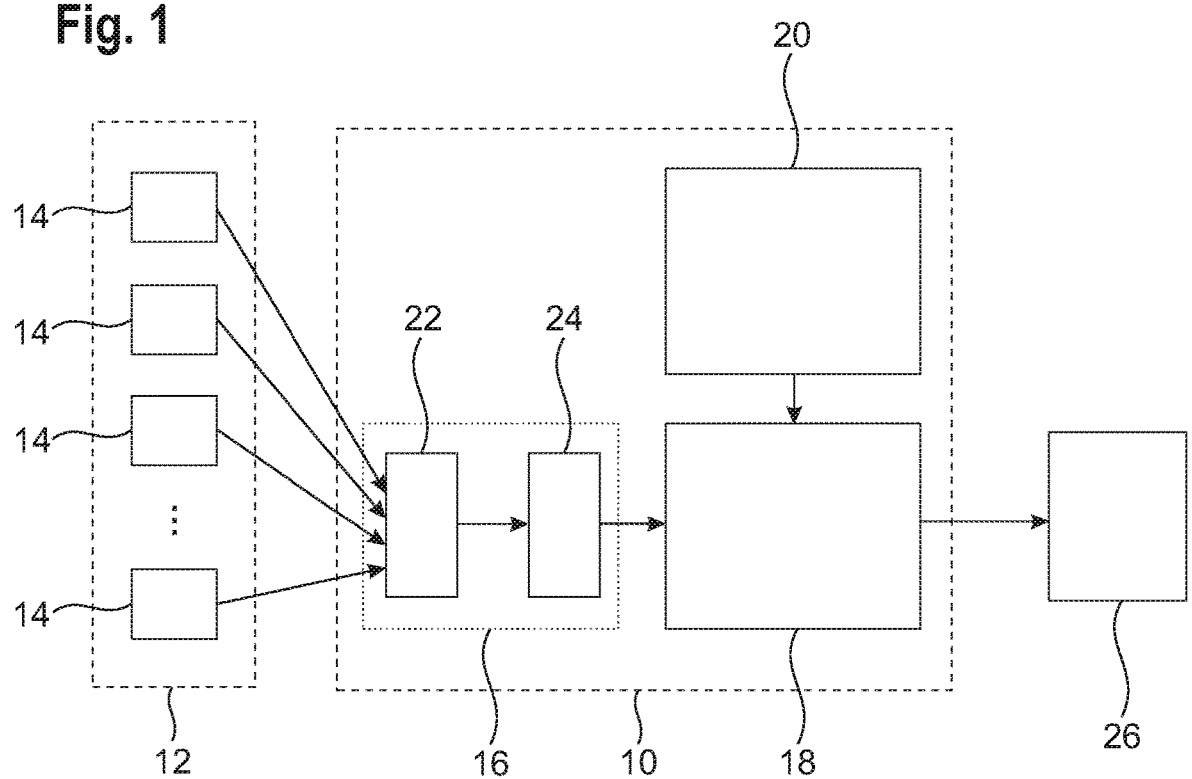
FIG. 1 schematically shows a notification system for monitoring a multi-component according to the disclosure.

FIG. 1 schematically shows a notification system 10 for monitoring a multi-component system 12 having several individual components 14. In general, the individual components 14 may each be established as hardware and/or software. For example, the individual components may be a combination of hardware and software.

For example, the individual components 14 of the multi-component system 12 may be individual computers, servers, switches, HUBs, cables, hard drives etc., in a computer network such as a cloud network, wherein various kinds of software may be executed on the respective computers and servers. In another example, the individual components 14 of the multi-component system 12 may be individual sensors, measurement instruments etc., in a measurement setup.

It will be appreciated that if the multi-component system 12 is a computer network, such as a cloud network, the notification system 10 may comprise, for example, a computer that is physically connected to the individual components 14 of the multi-component system 12 in a signal transmitting manner as well as appropriate software being executed on the computer, as will be explained in more detail below.

In an embodiment, the notification system 10 comprises an event processing module 16, a notification processing module 18 and a setting module 20. The event processing module 16 comprises an event input 22 as well as an event classifier module 24. As use herein, the term "module" is understood to comprise hardware and/or software, as appropriate for the actual context and type of the multi-component system 12 that is to be monitored. In some embodiments, for example, a module may include hardware and/or software for implementing the functionalities, technologies and methodologies described herein. In some embodiments, a module may include one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, a module may include combinations of circuits and computer program products having software or firmware instructions stored on one or more computer readable memories that work together to cause a device to perform one or more methodologies or technologies described herein. In other embodiments, a module is implemented solely in analog and/or digital circuitry. Of course, in some embodiments, two or more modules, or parts thereof, can be integrated or share hardware and/or software, circuitry, etc.

The event input 22 is connected to the multi-component system 12, for example to the individual components 14. Therein and in the following the phase that certain components and/or modules "are connected" is to be understood to mean a signal transmitting physical connection if the modules comprise hardware and/or a data transfer interface between individual software modules if the modules comprise software. The event classifier module 24 is interconnected between the event input 22 and the notification processing module 18. The setting module 20 is connected with the notification processing module 18.

Generally speaking, the notification system 10 is configured to monitor the multi-component system 12, more specifically the individual components 14, and to alert a user if one or more of the individual components 14 shows a predefined type of malfunction. More precisely, the notification system 10 is configured to perform a method of monitoring the multi-component system 12, which is explained in the following with reference to FIG. 2.

At least one event signal is received from at least one of the individual components 14 by the event input 22 (step S1). For example, several event signals are received from one or several of the individual components 14 simultaneously and/or consecutively.

Without restriction of generality, the case of several event signals being received by the event input 22 will be explained in the following, as this is the standard case when monitoring multi-component systems 12 having several individual components 14. However, the explanations below also apply to the case of a single event signal being received.

The event signals each comprise at least one status parameter that is indicative of a status and/or of a status change of at least one of the individual components 14. For example, if the multi-component system 12 is a computer network, the at least one status parameter may comprise information about individual computers in the network, for example information about their connection status (online or offline), power supply, responsivity, etc.

The at least one status parameter comprises a time stamp that indicates the time at which the respective status and/or the status change of the respective individual component 14 has been recorded. Moreover, the event signal may comprise at least one attribute parameter that is indicative of at least one property of at least one of the individual components 14. For example, if the multi-component system 12 is a computer network, the attribute parameter may be an IP address, a MAC address, a physical location of the respective component 14, an identification of software running on the respective component 14, an IP address of an unsuccessful login attempt etc.

Put differently, the event signals comprise information on events and on the times at which these events happen in the multi-component system 12 that affect the status of the individual components 14 in any way.

In the example of the multi-component system 12 being a computer network, such events may be processes like "device A having IP address B has gone offline at time T1" or "the power supply of server C" has been interrupted at time T2".

The event signals are then each classified into at least one of several event classes by the event classifier module 24 based on the respective at least one status parameter and the respective at least one attribute parameter (step S2). In other words, the event classifier module 24 analyses whether the event signals each match certain predefined rules and categorizes each of the event signals into one or several event classes. For example, one event signal may be categorized into several event classes if the respective event signal matches several of the predefined rules.

For the above-mentioned example of the multi-component system 12 being a computer network, examples for the event classes are: "device goes offline", "device goes online", "power supply of device is cut off", "power supply of device is functional", "device is not responsive", "device is responsive".

Alternatively or additionally, there may be event classes that take into account the location of placement of the individual components 14. For example, the event classes may take into account in which office the respective individual component 14 is located.

Generally speaking, the event classes each are associated with a "good state" or a "bad state" of the respective component 14, wherein "good state" means that there is no malfunction of the respective component 14, at least regarding a function of the component 14 described by this event class. Accordingly, "bad state" means that there is a malfunction of the respective component 14 regarding this event class.

The event classes may also comprise a priority parameter, wherein the priority parameter is indicative of how urgent a malfunction falling into the respective category is. Moreover, the event classes may have a hierarchical structure, each of the event classes having a certain hierarchy level. For example, this is the case if events being associated with one event class inevitably cause events associated with another event class. Event classes having a higher hierarchy level are associated with events that cause events being in an event class of lower hierarchy level. For example, a power outage in an office automatically causes all computers in that office to be offline.

The notification processing module 18 generates a user notification based on the at least one event class that the event signals have been categorized into (step S3). More precisely, the notification processing module generates exactly one user notification for each event class given that the respective event class is associated with a "bad state" of the respective component 14 and at least one event signal has been classified into the respective event class.

In other words, event signals coming from different individual components 14 and being classified into the same event class are aggregated into a common user notification. Thus, the number of user notifications is significantly reduced.

On the other hand, if all event signals are classified into event classes being associated with a "good state" of the respective individual component, no user notification may be generated at all.

Moreover, the notification processing module 18 may generate the user notification based on at least one of a number of event signals, an event signal rate, a time development of the number of event signals and a time development of the event signal rate.

On one hand, the respective user notification may comprise information on the number of event signals falling into the respective event class being associated with the respective user notification, the event signal rate, the time development of the number of event signals and the time development of the event signal rate. On the other hand, the user notification may be generated only if certain thresholds regarding at least one of the number of event signals, the event signal rate, the time development of the number of event signals and the time development of the event signal rate are met.

For example, if the respective event class is "bit error in the data stream", the user notification may only be generated if a certain event signal rate is met, e.g., if a certain bit error rate is met.

Figure 2:
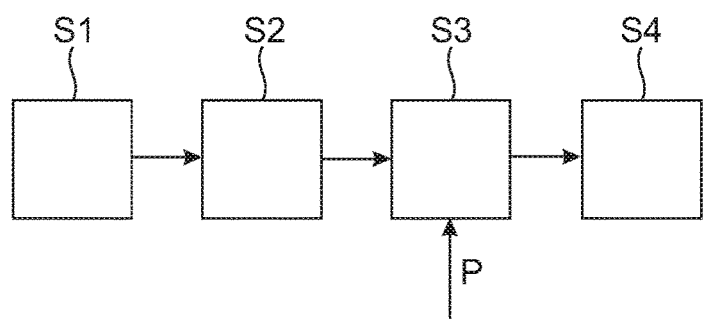
FIG. 2 shows a block diagram of a method of monitoring a multi-component system according to the disclosure.

Moreover, the notification processing module 18 generates the user notification based on at least one setting parameter comprised in the setting module 20, as is represented by the arrow labelled with "P" in FIG. 2. More specifically, the notification processing module 18 may approve, save or discard the user notification based on the at least one setting parameter.

Generally speaking, the at least one setting parameter comprises information on which event classes have to be considered, which event classes have to be temporarily ignored, and which event classes have to be permanently ignored when generating the user notifications.

Of course, a user may adapt the setting parameter and thus choose which type of user notifications are generated. In other words, the user may choose about which type of events in the multi-component system 12 the user notifications are generated. For example, the user may adapt the at least one setting parameter via a graphical interface.

If the respective user notification is approved, the user notification is forwarded to the user (step S4). For example, the user notification is sent to a user device 26. The user device 26 may be a computer, a laptop, a smartphone, a tablet or any other kind of smart device. Accordingly, the user notification is transmitted to the user device 26, for example, via at least one of email, text message, push message and frontend. The user notification may be forwarded to the user device 26 via a monetary or non-monetary messenger service.

If the user notification is saved by the notification processing module 18, the user notification is not sent to the user device 26 immediately, but possible later, for example after a predetermined time span. If the user notification is discarded by the notification processing module 18, the user notification is not sent to the user. For example, a user notification is discarded if the respective event signal is classified into several event classes being in a hierarchical relation with one another, as explained above, and the respective event class is on a lower hierarchy level.

In this case, only the user notification being associated with the event class having the highest hierarchy level may be approved, while the user notifications being associated with event classes having a lower hierarchy level may be discarded.

It will be appreciated that several components have been described herein as capable of "processing" signals, "transmitting" signals, "classifying" signals, "generating" signals, and the like, or that various signals are being "analysed," "compared," "classified," "measured", "generated" etc., by such components. These functionalities can be carried out in embodiments of the present disclosure by analog circuitry, digital circuitry, or a combination of analog and digital circuitry, and can include discrete digital or analog circuit elements or electronics, or combinations thereof. Such circuitry is configured and arranged in order to implement the functionalities, technologies and methodologies set forth herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A notification system for monitoring a multi-component system, comprising:
    a notification processing circuit;
    a setting circuit comprising at least one setting parameter, wherein the at least one setting parameter comprises information on which event classes have to be considered, which event classes have to be temporarily ignored, and which event classes have to be permanently ignored for generating user notifications; and
    an event processing circuit comprising an event input and an event classifier circuit, wherein said event input is configured to receive an event signal that comprises at least one status parameter, said at least one status parameter being indicative of at least one of a status and a status change of at least one component of the multi-component system,
    wherein said event classifier circuit is configured to classify the event signal into at least one event class based on said at least one status parameter,
    wherein said notification processing circuit is configured to generate no user notification or at least one user notification based on said at least one event class,
    wherein said notification processing circuit is configured to aggregate several event signals coming from different individual components of the multi-component system and being classified into the same event class into a common user notification, and
    wherein said notification processing circuit is configured to save said at least one user notification based on said at least one setting parameter, wherein the saved user notification is not sent to the user immediately.

2. The notification system of claim 1, wherein the notification processing circuit is configured to at least one of approve or discard said at least one user notification based on said at least one setting parameter.

3. The notification system of claim 1, wherein said status parameter comprises a time stamp, said time stamp being a time of recording of the at least one of said status or said status change.

4. The notification system of claim 1, wherein said event signal comprises at least one attribute parameter, said at least one attribute parameter being indicative of at least one property of said at least one component.

5. The notification system of claim 4, wherein said event classifier circuit is configured to classify the event signal into said at least one event class based on said at least one attribute parameter.

6. The notification system of claim 4, wherein said notification processing circuit is configured to generate said at least one user notification based on said at least one attribute parameter.

7. The notification system of claim 1, wherein said notification system is configured to transmit said at least one user notification via at least one of email, text message, push message or web frontend.

8. The notification system of claim 1, wherein said notification processing circuit is configured to generate said at least one user notification based on at least one of a number of event signals, an event signal rate, a time development of said number of event signals or a time development of said event signal rate.

9. A method of monitoring a multi-component system, the method comprising:
    receiving an event signal, said event signal comprising at least one status parameter, said at least one status parameter being indicative of at least one of a status or a status change of at least one component of the multi-component system;
    classifying the event signal into at least one event class based on said at least one status parameter; and
    generating no user notification or at least one user notification based on said at least one event class,
    wherein event signals coming from different individual components of the multi-component system and being classified into the same event class are aggregated into a common user notification, and
    saving the at least one user notification based on at least one setting parameter, wherein the saved user notification is not sent to the user immediately, the at least one setting parameter comprising information on which event classes have to be considered, which event classes have to be temporarily ignored, and which event classes have to be permanently ignored for generating user notifications.

10. The method of claim 9, wherein said at least one user notification is at least one of approved or discarded.

11. The method of claim 9, wherein said status parameter comprises a time stamp, said time stamp being a time of recording of the at least one of said status or said status change.

12. The method of claim 9, wherein said event signal comprises at least one attribute parameter, said at least one attribute parameter being indicative of at least one property of said at least one component.

13. The method of claim 12, wherein the event signal is classified into said at least one event class based on said at least one attribute parameter.

14. The method of claim 12, wherein said at least one user notification is generated based on said at least one attribute parameter.

15. The method of claim 9, wherein said at least one user notification is transmitted via at least one of email, text message, push message or web frontend.

16. The method of claim 9, wherein said at least one user notification is generated based on at least one of a number of event signals, an event signal rate, a time development of said number of event signals or a time development of said event signal rate.

* * * * *